UNITED STATES PATENT OFFICE.

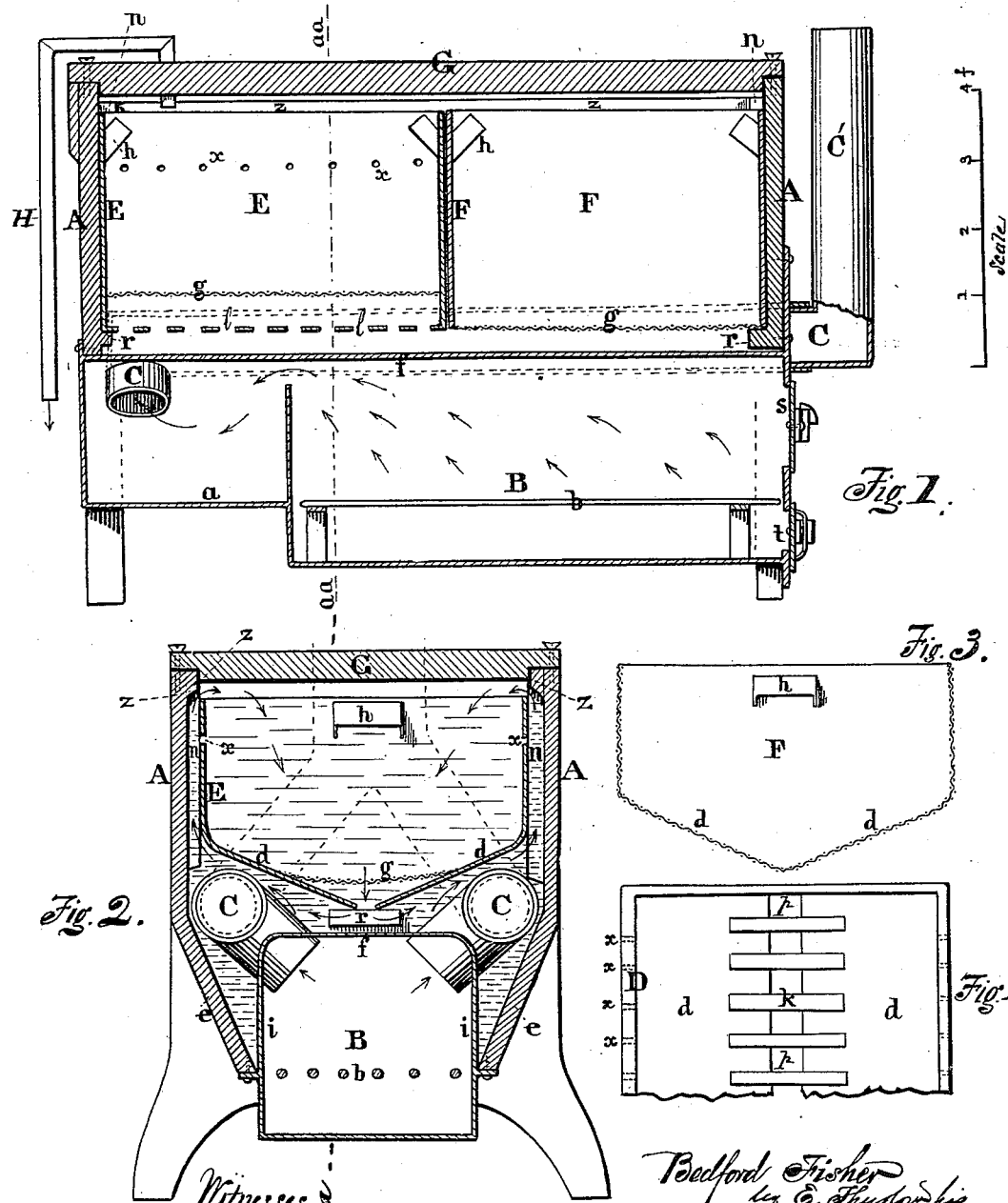

BEDFORD FISHER AND WILLIAM WICKKISER, OF EL PASO, ILLINOIS.

IMPROVEMENT IN FEED-COOKERS.

Specification forming part of Letters Patent No. 167,516, dated September 7, 1875; application filed June 29, 1875.

*To all whom it may concern:*

Be it known that we, BEDFORD FISHER and WILLIAM WICKKISER, of El Paso, in the county of Woodford and in the State of Illinois, have invented an Improvement in Convertible Feed-Cooker and Wash-Boiler; and do hereby declare that the following is a full, clear, and exact description thereof, reference being had to the annexed drawings, making a part of this specification, in which like letters of reference refer to like parts, and in which—

Figure 1 represents a vertical longitudinal section; Fig. 2, a vertical cross-section on line *a a*, Fig. 1; Fig. 3, vertical section of kettle F; Fig. 4, plan of kettle D.

The object of our invention is to furnish a feed-cooker and wash-boiler, (convertible,) which shall contain several distinct kettles, devised and constructed for greater portability in transporting food to stock in the kettles themselves, which carrying has heretofore been laboriously done by shoveling the food out of the boiler; and the invention consists in, first, an outer box or boiler of metal or wood, or of both, provided with a furnace, having a right and left flue uniting in the chimney. The boiler contracts at the bottom over the furnace and flues, to gather or concentrate the heat on the water at that point, and nearly filling said boiler is a kettle, also made of either wood or metal, or combination of the two, or, in place of one kettle, several kettles, all made with trough-shaped bottoms, *i. e.*, a bottom which slopes to the center laterally for directing the ascending current of hot water up the outside of each kettle to the contained food or clothes. Each kettle has an opening in the form of a slot or a row of perforations along the angle at the bottom, crossed by slats or a wire screen, or both, to prevent the escape of food or clothes downward, but to allow the incoming water to descend again through the food to the furnace to be reheated. A space is preserved all round the kettle or kettles (by interposing between them and the sides of the boiler proper shoulders) for the current to pass upward to the top of the same, whence said current is deflected into the kettles by horizontal conductors, also attached to the edge of the boiler. Above this is a steam-tight cover over all, hinged or fastened with set-screws, through which passes a food steaming or heating pipe, to be led into a proper vessel.

We are aware that the principle of boiling and washing clothes by ascending currents of hot water in pipes is not new. In place of one large kettle we employ a row of smaller kettles, occupying the same space in the boiler, all of the same general shape and principle of construction. Either or all of them may be made with a wire-gauze bottom, and sides of wood or metal, or wholly of wood, with a screen to prevent escape of contents through the opening in the bottom of each, and a row of holes along the sides to admit inflowing water when the latter is low, or there is less food in the kettle.

In the drawings, (which represent one of the forms in which we construct this boiler,) A represents the boiler, that part above the furnace being made of metal, or of any suitable wood, properly attached to and made water-tight at its juncture with the furnace, or flanges projecting from the same for the purpose, having a tight cover, G, screwed to the upper edges, and with the bottom *e e* converging or sloping toward the furnace B and its flues C C. Above the latter are placed shelves *r r* to support the end of the kettle, and auxiliary to the other shoulders *n n n n*, placed in the vertical corners of said boiler, to preserve a passage for the heated rising current of boiling water between the boiler and kettles. This current is deflected into the kettles by the conductors *z z* along the upper edges of said boiler A. We also find it useful to cut off one end of the boiler by a water-tight partition as a separate reservoir for clean water. B is the furnace, provided with two return-flues, C C, branching each laterally from the furnace into the water-space, and uniting to form the chimney C' outside, which, with the attached elbows of the flues, is removable, for the convenience of packing the boiler in transmission by telescoping the elbows within the horizontal flues. D is a large form of kettle, made of wood or metal, or a combination of same, square in plan, with a trough-shaped bottom, *d d*, divided by a longitudinal aperture, *p*, defended by slats *l l*, to prevent the passage of the contents. This kettle occupies the whole of the boiler-space above the furnace, excepting the narrow passages on each side preserved by the shoulders n n, &c., and is especially adapted for the boiling of clothes. (See Fig. 2.) E F represent other forms and sizes of kettles of the same general shape as that of the one just described. Each has a handle at either end. E has a series of large holes, l l, along the lowest angle, defended above by a wire screen, g. F has the ends united by woven-wire sides and bottom, without lower apertures.

As observed before, a range of several kettles of either of the above-described constructions may be used in place of the larger one, so that the food may be carried away cooked in small portable quantities in the kettles themselves. H represents the steaming-pipe for warming food in a separate vessel.

Along the sides of the kettles D E is a row of holes, x x, for admitting water when its level is lower in the boiler, or when there is but a small quantity of food or clothes to be treated, and similar holes we also use in the smaller kettles.

The operation of this invention is that food is cooked or clothes boiled by the ascending currents of boiling water directed upward by the inclined bottom of the kettles, (between these and the boiler,) and deflected into the latter by the conductors z z, thence passing down through the food or clothes, and out through the opening in the bottom. The plurality of kettles renders the labor of feeding stock easy, as the kettle is made small enough to be deportable with its contents to the animal, and in sufficient numbers to cook a large quantity at once.

What we claim as our invention is—

1. The combination of the boiler A, having sloping sides or bottom e e converging upon the furnace and flues B C C, shoulders r r n n n n, current-conductors z z, furnace B, lateral return-flues C C through the water-space, and the front elbows, made removable by telescopic means, substantially as described.

2. The convertible feed and wash boiler, composed of the boiler A, lateral flues C C, furnace B, interchangeable kettles D E F, cover G, and steam-pipe H, constructed, arranged, and operating as and for the purposes set forth.

3. In combination, the kettle E, having sloping perforated bottom d d, with openings l l, and screen g or cross-slats k, as constructed, arranged, and operated.

In testimony that we claim the foregoing convertible feed-cooker and clothes-boiler, we have hereunto set our hands this 17th day of June, 1875.

BEDFORD FISHER.
WILLIAM WICKKISER.

Witnesses:
W. H. BUEL,
W. R. WILLIS.